No. 640,626. Patented Jan. 2, 1900.
W. F. BRAUN.
AUTOMATIC WEIGHING MACHINE.
(Application filed Jan. 25, 1899.)
(No Model.) 10 Sheets—Sheet 1.

Fig. 1.

Witnesses.
JB Weir
Robert Weir.

Inventor
William F. Braun
By Chas. C. Bulkley, atty.

No. 640,626. Patented Jan. 2, 1900.
W. F. BRAUN.
AUTOMATIC WEIGHING MACHINE.
(Application filed Jan. 25, 1899.)

(No Model.) 10 Sheets—Sheet 2.

Fig. 2.

Witnesses,
J B Weir
Robert Weir.

Inventor,
William F. Braun,
By Chas. E. Buckley,
Atty.

No. 640,626. Patented Jan. 2, 1900.
W. F. BRAUN.
AUTOMATIC WEIGHING MACHINE.
(Application filed Jan. 25, 1899.)

(No Model.) 10 Sheets—Sheet 6.

Fig. 6.

Witnesses:
JB Weir
Robert Weir

Inventor
William F. Braun,
By Chas. C. Bulkley,
Atty.

No. 640,626. Patented Jan. 2, 1900.
W. F. BRAUN.
AUTOMATIC WEIGHING MACHINE.
(Application filed Jan. 25, 1899.)
(No Model.) 10 Sheets—Sheet 7.

Witnesses
JBSWeir.
Robert Weir.

Inventor,
William F. Braun
By Chas. C. Buckley
att.

No. 640,626. Patented Jan. 2, 1900.
W. F. BRAUN.
AUTOMATIC WEIGHING MACHINE.
(Application filed Jan. 25, 1899.)

(No Model.) 10 Sheets—Sheet 9.

Fig. 11.

Witnesses:
J B Weir
L. M. Buckley.

Inventor
William F. Braun
By Chas. C. Buckley,
Atty.

No. 640,626. Patented Jan. 2, 1900.
W. F. BRAUN.
AUTOMATIC WEIGHING MACHINE.
(Application filed Jan. 25, 1899.)

(No Model.) 10 Sheets—Sheet 10.

UNITED STATES PATENT OFFICE.

WILLIAM F. BRAUN, OF CHICAGO, ILLINOIS, ASSIGNOR TO JOHN E. SEARLES, OF NEW YORK, N. Y.

AUTOMATIC WEIGHING-MACHINE.

SPECIFICATION forming part of Letters Patent No. 640,626, dated January 2, 1900.

Application filed January 25, 1899. Serial No. 703,344. (No model.)

*To all whom it may concern:*

Be it known that I, WILLIAM F. BRAUN, a citizen of the United States of America, and a resident of Chicago, Cook county, Illinois, have invented a certain new and useful Improvement in Automatic Weighing-Machines, of which the following is a specification.

My invention relates to certain improvements in what are known as "automatic weighing-machines," by which materials or commodities capable of movement in the form of a continuous stream are continuously and alternately weighed and separated in predetermined quantities and then discharged into the several receptacles for each individual quantity. In this class of machines a pivoted scale-beam is employed, having a receptacle at one end to receive the material and a weight at the other end. The material in the form of a stream is fed or permitted to feed into the receiver by means of a valve or cut-off gate. The valve or cut-off gate is usually termed a "stream-controller valve," and the receiver for the material to be weighed is usually termed a "load-receiver." The scale-beam, with its load-receiver at one end and the counterbalance-weight at the other, operates as in the case of an ordinary weighing-scale to weigh a predetermined quantity of material. When the predetermined given quantity of material is delivered into the load-receiver, it is evident that then the cut-off valve or gate must be closed and the supply of material withheld momentarily until the weighed quantity of material in the load-receiver is discharged and the load-receiver returned into a position to receive another given predetermined quantity of material. The cut-off valve or gate must then be opened automatically to permit the material to feed into the load-receiver.

My present invention, as illustrated, described, and claimed herein, relates more particularly to the means by which the stream of material is controlled and fed or permitted to feed into the load-receivers.

In an application concurrently filed by me I have illustrated, described, and claimed mechanism by which the "cut-off" valves, so called, are operated and the scale-beam and load-receiver brought into a discharging position, and although for the sake of clearness I shall particularly describe this mechanism herein it will be understood that I do not claim the same except in combination with certain features which are not illustrated, described, nor claimed in said application.

One object of my present invention is to dispense with the cut-off or stream-controlling valves and to provide a force-feed for the material, which shall also serve to control and check the flow of said material.

A further object of this invention is to provide means whereby the force-feed of the material may be automatically controlled in such a manner as to feed the maximum quantity when the load-receiver is empty and gradually vary the force-feed so that the quantity of material positively fed into the load-receiver gradually diminishes until the load-receiver is filled, when the supply is cut off.

My invention has certain other objects in view, which will be particularly described and pointed out hereinafter; and it consists in certain features of combination, arrangement of parts, and construction, which will also be particularly described, and generally and specifically pointed out in my claims, reference being now had to the accompanying drawings, in which—

Fig. 10 is a detail view of the transmitting-gear for the variable force-feed. Fig. 12 is a section on the line *e e* of Fig. 6.

As shown and described in the application aforesaid, I embody in one machine a plurality of scale-beams, with their load-receivers, and a corresponding number of stream-directing chutes from a hopper, each of said scale-beams acting alternately to weigh the material and each of the load-receivers alternately receiving and dumping its load.

I shall proceed with the description of those features which are claimed in the application aforesaid and in connection therewith describe the features of my present invention, particularly designating them as such when so described.

A main shaft 12 near the base of the machine is driven by a pulley 13, belted to the line-shafting in the usual way. Cam-shafts 14 and 15 extend at right angles to the drive-shaft 12, and worm-gears 16 and 17 on the drive-shaft, meshing with the worm-wheels 18 and 19, mounted on the cam-shafts 14 and 15, serve to rotate said cam-shafts.

Figure 1:
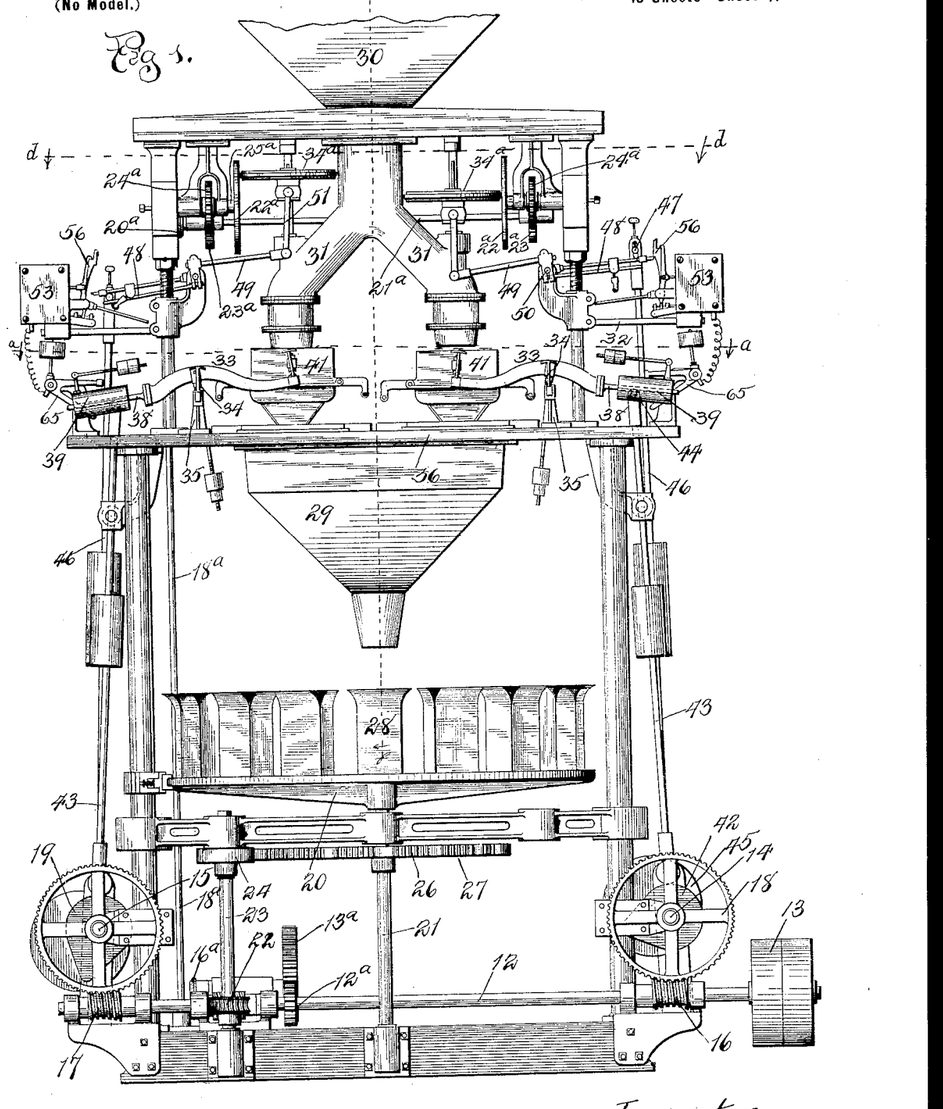
Figure 1 is a front elevation of the complete machine.

A rotatable package-carrier table 20, horizontally supported by the vertical shaft 21, is intermittently rotated by means of the worm-gears 22, respectively, on the drive-shaft 12 and the table-actuating shaft 23. Secured near the upper end of the table-actuator shaft 23 is a pinion drive-wheel 24, carrying the segment of gear 25, Fig. 1, adapted to intermittently engage the segments of gear 26 on the table-rotating wheel 27, secured on the vertical shaft 21. The package-carrier table 20 has secured thereon the bag-holders 28, arranged in a circle, and the paper bags to receive the weighed materials are placed in these holders and held in a position to receive and be filled with the weighed material. The circular line of holders are arranged so that the bags are brought one by one below the delivery-orifice of the discharge-hopper 29, and an attendant at the machine removes the filled packages and adjusts the unfilled paper bags within the holders. The worm-gear connections and the intermittent segmental gear-sections are so arranged and timed in their operation to rotate the table that the bags are brought one by one beneath the discharge-orifice of the discharge-hopper 29 and receive the weighed loads of material as and when they are discharged by the automatic weighing mechanism to be described.

The material is deposited within the receiving-hopper 30, from which depends, as shown, the four stream-delivery chutes 31. The stream of material in the chutes 31 is controlled by means of the screws 32. These cut-off screws are actuated by means to be described. The use and adaptation of these screw controllers, in combination with the means for controlling or determining their movement, constitute the invention which is claimed herein.

As the mechanism by which the material is weighed, the movement of the screws controlled, and the material discharged from the load-receiver is the same in all of the plural sets, it will suffice to describe the arrangement and operation of one set.

Figure 7:
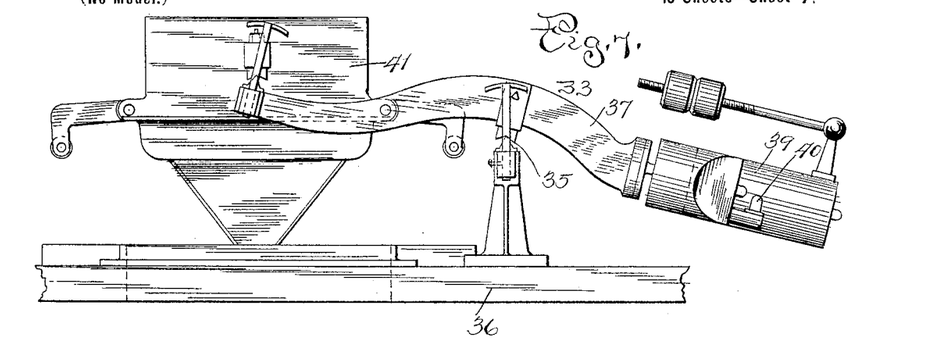
Fig. 7 is a detail view of the scale-beam, with the load-receiver in a position to receive its load.
Figure 8:
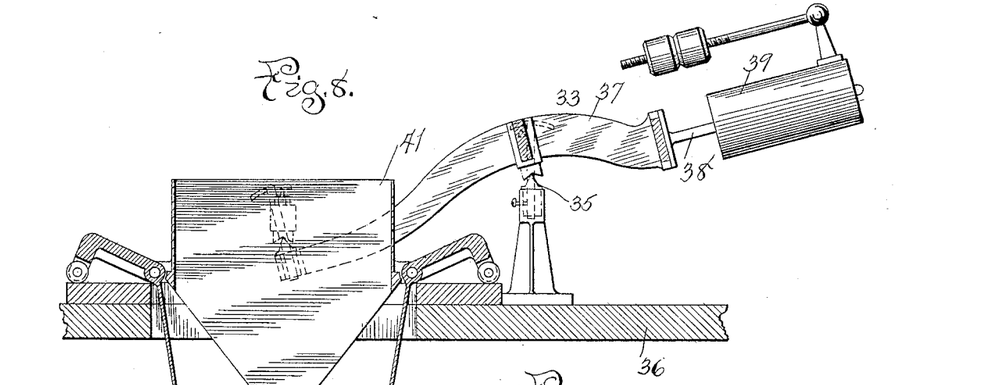
Fig. 8 is a like view with the load-receiver in section, showing said load-receiver in a discharging position.
Figure 9:
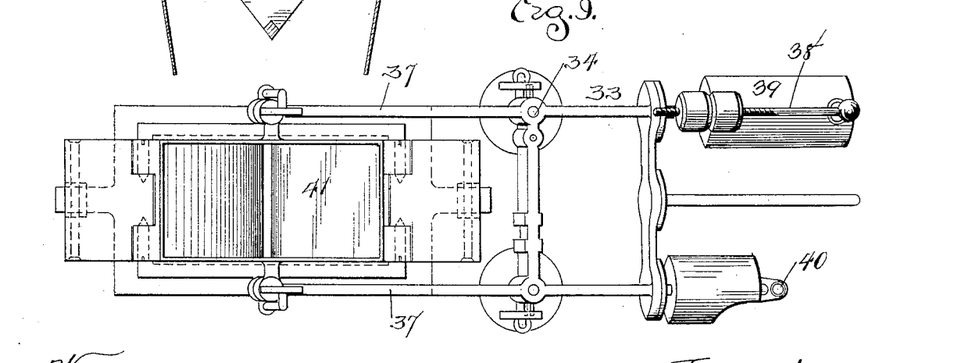
Fig. 9 is a like plan view of the scale-beam and load-receiver.

A scale-beam or scale-beam frame 33 is mounted pivotally at 34 upon the pedestal-support 35, secured to the top plate 36. The scale-beam frame 33 comprises the arms 37, Fig. 9, and the rearwardly-extended weight-arms 38, carrying the counterbalance-weights 39. The scale-beam also carries a contact-maker 40, the purpose of which will be hereinafter described. The load-receiver 41 is mounted to pivotally swing on the arms 37 of the scale-beam 33. It is obvious, therefore, that the load-receiver, the scale-beam, and the weights operate in the same manner as an ordinary scale to weigh material delivered into the load-receiver, as more particularly shown in Figs. 7 and 8.

It is necessary in order that the machine may operate automatically that means should be provided to automatically control the stream of material, cut it off when the predetermined quantity is deposited in the load-receiver and weighed, and also act upon the scale-beam to advance the load-receiver from a poised position into a position of discharge. To accomplish these ends, I provide the positively-acting cam mechanism in coöperative arrangement with electrically-operated devices which I shall now describe.

In the machine as shown are four sets of devices which receive, respectively, the stream of material and weigh and discharge the same. The cam-shaft 14 on one side of the machine serves to operate one pair of sets and the cam-shaft 15 on the other side of the machine the other pair of sets. I shall, however, describe the construction, arrangement, and operation of parts by which one set of automatic weighing mechanism is controlled. A discharge-cam 42 is secured upon the cam-shaft 14 and operates to reciprocate a discharge-rod 43, having at its upper end an engaging finger 44, adapted to strike the scale-beam at a point near the counterbalance-weights 39. The function of this cam 42 and rod 43 is to positively and directly engage the scale-beam when poised and force the load-receiver, with the weighed contents thereof, into a discharging position. In these respects my present machine does not differ from the one described in the application aforesaid.

Figure 2:
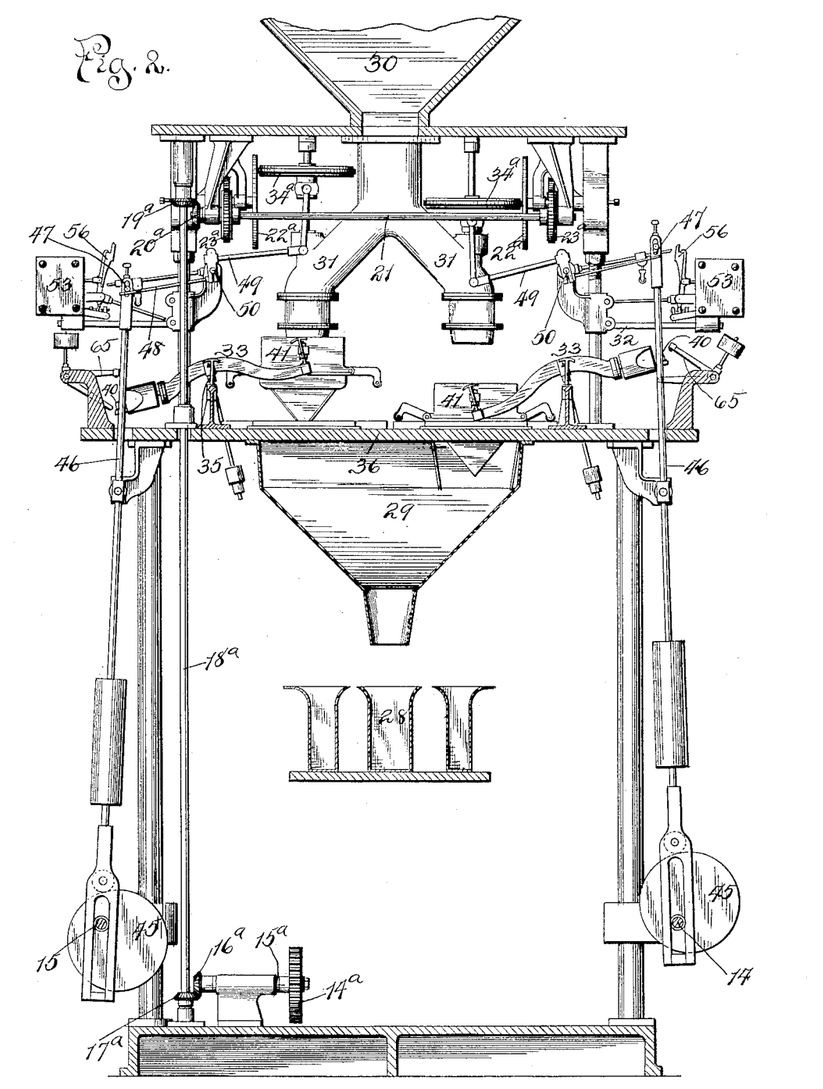
Fig. 2 is a central vertical section through the complete machine.
Figure 3:
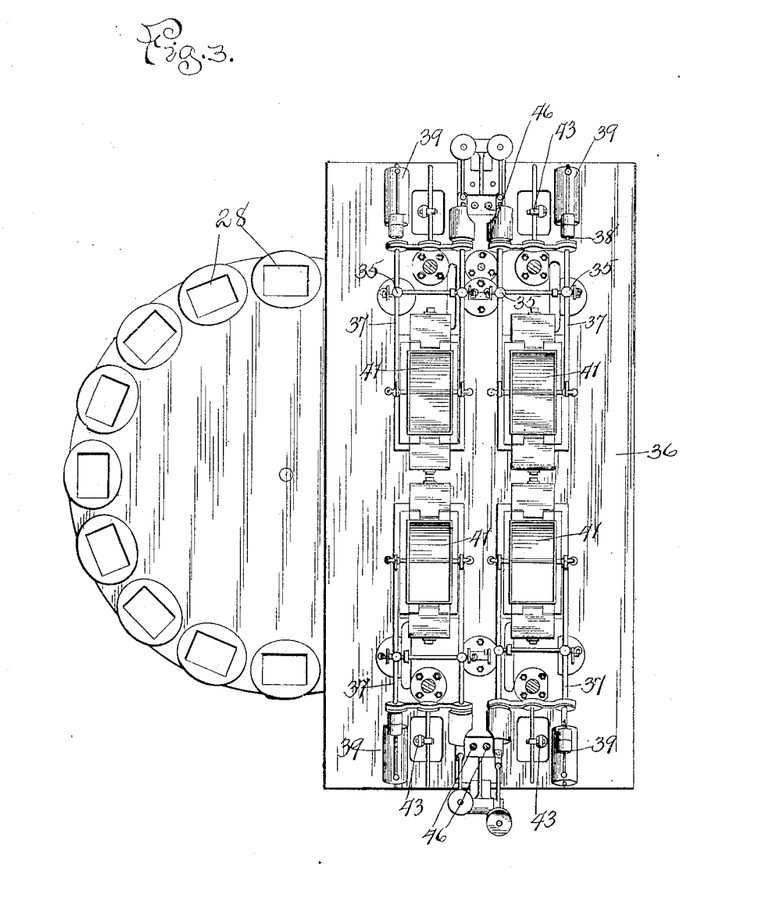
Fig. 3 is a plan view of the machine on the line *a a* of Fig. 1.
Figure 4:
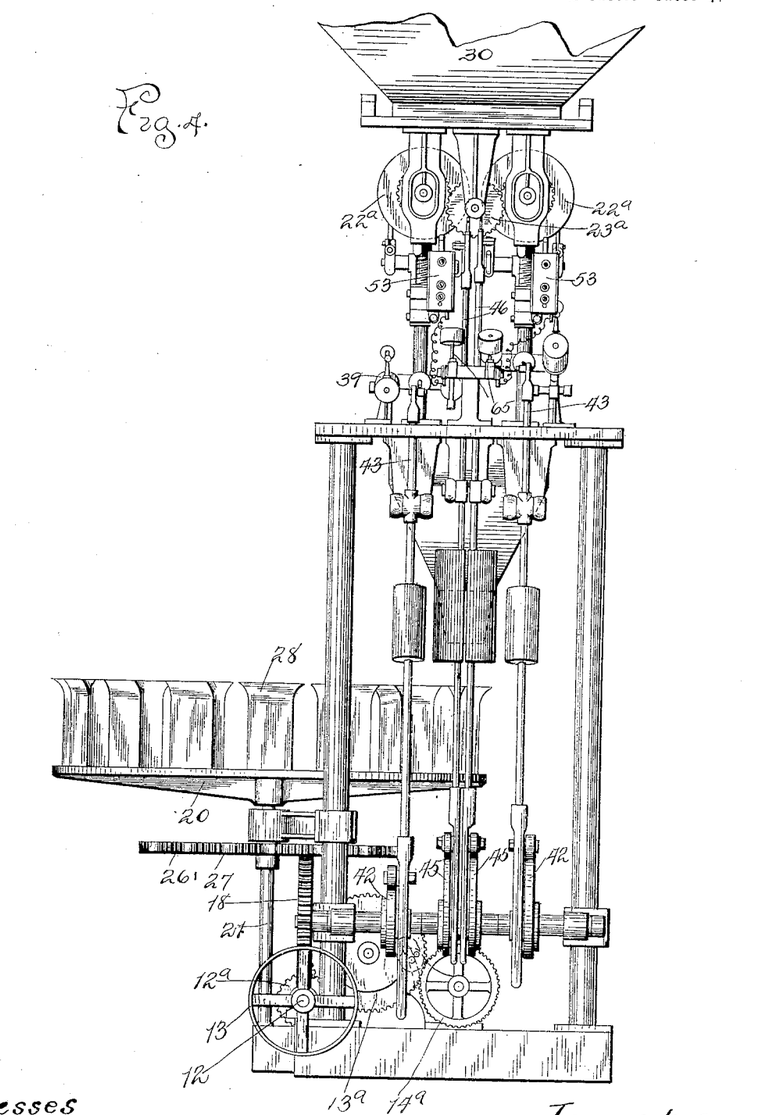
Fig. 4 is a side elevation of the machine.
Figure 5:
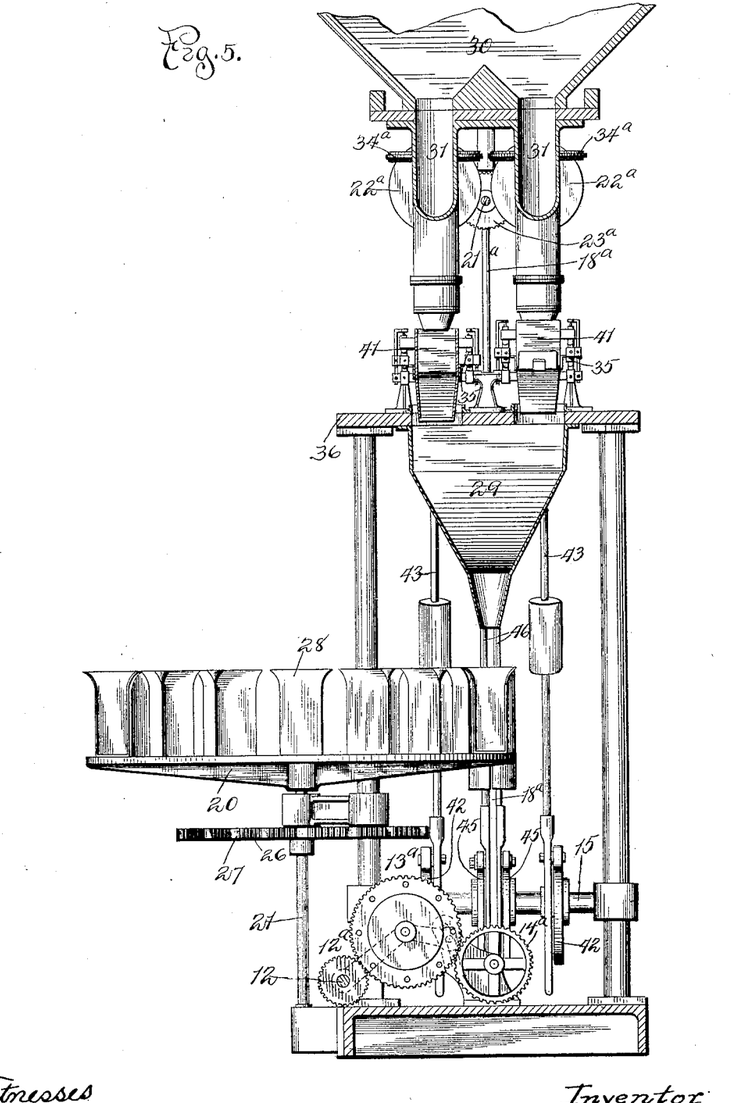
Fig. 5 is also a vertical sectional view on the line *b b* of Fig. 1.
Figure 6:
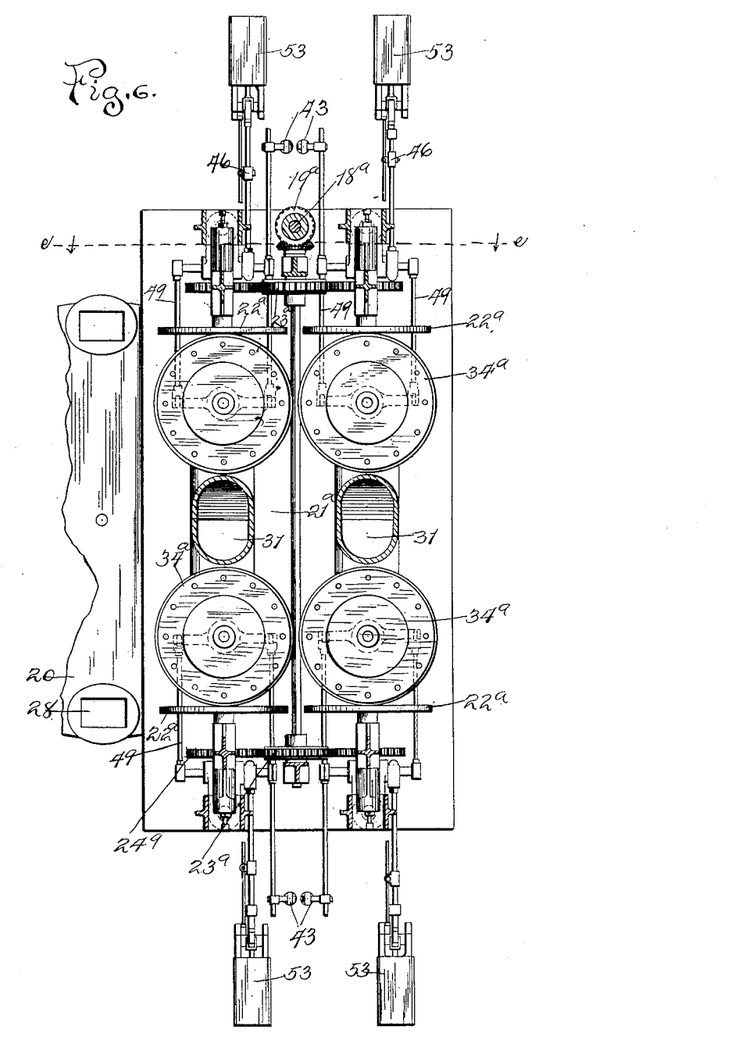
Fig. 6 is a transverse section on the line *d d* of Fig. 1.
Figure 11:
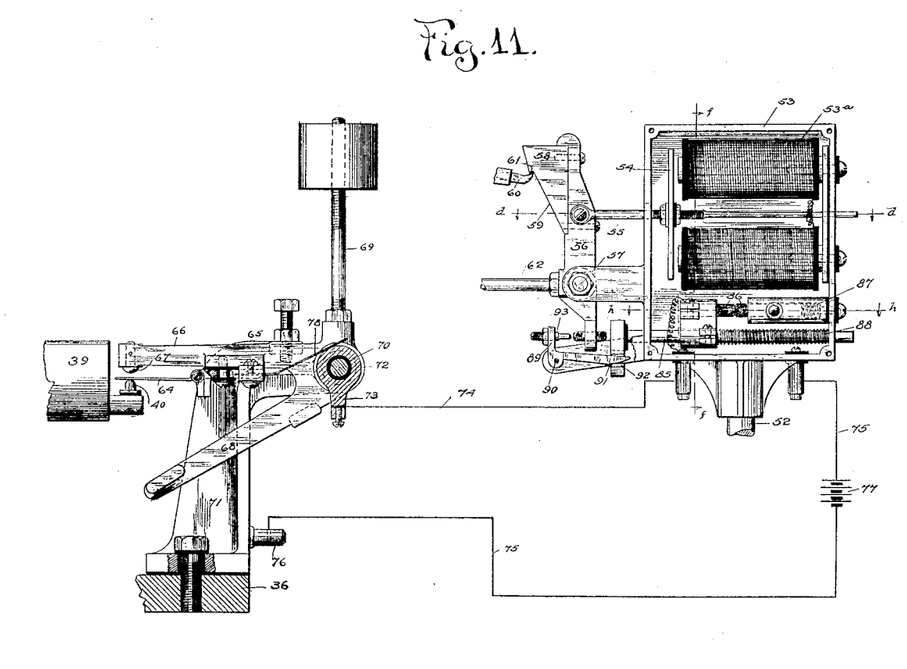
Fig. 11 is a detail view showing the circuit connections, circuit-closer apparatus, and electromagnetically-operated tripping mechanism.

To control the movement of the stream-controlling screws 32, I provide a stream-controller cam 45, eccentrically mounted on the shaft 14, and a stream-controller rod 46, reciprocated by said cam 45. These screw stream-controllers are rotated by means of mechanism initially operated by the drive-shaft 12 in the following manner: A gear-wheel 12$^a$, secured on the drive-shaft 12, meshes with an intermediate larger gear-wheel 13$^a$, Fig. 5, and this wheel in turn gears with the gear-wheel 14$^a$, mounted on the counter-shaft 15$^a$, Fig. 2. A bevel gear-wheel 16$^a$ on the counter-shaft 15$^a$ meshes with a bevel gear-wheel 17ª on a vertical transmitting-shaft 18ª, which latter carries at its upper end a bevel gear-wheel 19ª, meshing with the bevel gear-wheel 20ª on the transverse counter-shaft 21. By this means a movement of rotation is imparted to the counter-shaft 21, and this movement is communicated to the friction driving-disk 22ª by means of the gearing shown more particularly in Fig. 11 and comprising means whereby to drive the friction driving-disk of two sets of weighing mechanism. The driven bevel gear-wheel 20ª therefore imparts a movement of rotation to the intermediate gear-wheel 23ª on the counter-shaft 21, and this intermediate gear-wheel meshes with the disk-driving gear-wheels 24ª, mounted on the counter-shafts 25ª of the driving-disks 22ª.

Referring now to Fig. 10, it will be observed that the screw stream-controllers 32 are mounted fixedly upon the vertical controller-shafts 33ª and that the driven friction-disks 34ª are splined upon said shafts, and therefore are capable of longitudinal movement thereon vertically. The screw stream-controllers are, as is apparent, caused to rotate within the chutes 31 by means of the intermediate mechanism between the main drive-shaft 12 and the connection established by the friction-disks. It is also apparent that the speed of rotation of the screw stream-controllers is the greatest when the driven disk 34ª is nearest to the periphery of the driving-disk 22ª, and as the driven disk 34ª approaches the center of the driving-disk 22ª the speed of rotation of the screw stream-controller 32 gradually diminishes. At the center or near the center of the driving-disk 22ª a concave recess 35ª is formed, and when the periphery of the driven disk 34ª is opposite this recess the two disks are disengaged, and the driving-disk 22ª then rotates independent of the driven disk. When the two disks are in this position, the stream of material is completely cut off.

I will now proceed to describe the means by which the driven disk is moved longitudinally upon its shaft automatically to gradually increase the speed of rotation of the screw stream-controller.

The upper end of the cam-operated rod 46 carries an antifriction-finger 47, adapted to engage the arm 48 of the connecting-frame 49, pivoted at 50, and the inner end of the said frame 49 is connected by the linking arm or rod 51 with the driven friction-disk 34ª. It is now evident that if the outer end of the frame 49 is pulled downward the friction-disk 34ª will be raised vertically on the shaft 33ª, and if said outer end of the frame is released it is evident that the said disk 34ª will move downward by gravity on said shaft. Assume the driven friction-disk 34ª to be in its uppermost position, as shown to the left in Fig. 1 and to the right in Fig. 10, the said disk is then rotated at its greatest velocity by the driving-disk 22ª, and consequently the screw-controller 32 is feeding the maximum quantity of the material in the chutes 31. At this stage of operation the load-receiver 41 is empty and in a position to receive its load, as shown to the right in Fig. 1. The maximum of material in quantity is now fed into said load-receiver and the quantity gradually decreased by a decrease in velocity of rotation of the screw-controllers 32. This is accomplished by means of the cam 45 and the cam-rod 46, which latter, gradually rising, permits the driven friction-disk 34ª to descend toward the central or neutral point of the driving-disk 22ª, and as it descends the movement of rotation imparted to said disk consequently decreases, with a necessary decrease in the feed of the material. Just before the driven disk reaches the neutral point, or point of no movement, the connecting-frame 49 is engaged by a tripping device, which I shall now describe.

Supported upon a standard 52 is a magnet-box 53, inclosing the electromagnets 53ª. An armature 54 operates an armature-rod 55, connected to the tripping-lever 56, which latter is pivoted at 57. The upper end of the tripping-lever 56 carries a notched engaging head 58, having an inclined face 59. The extreme end of the tripping-rod 60, extended from the connecting-frame 49, is adapted to slidably bear against the inclined face 59 of the engaging head 58, and also engage in the notch 61 thereof. An arm 62, secured to and projected forward from the tripping-lever 56, is adapted to be engaged by an adjustable antifriction member 63 on the connecting-frame when it is pulled downward by the rod 46, and thus the head 58 of the tripping-lever 56 is drawn forward into a position to engage with said tripping-rod 60, as described, and the armature 54 also drawn away from the electromagnets 53ª.

In these respects my present invention does not differ from the construction shown in the application aforesaid.

I shall now proceed to describe the circuit arrangement and means for energizing and discharging the electromagnets 53ª, which latter includes a tilting circuit-closer operated by the scale-beam 33 and a supplemental circuit-breaker in the magnet-box 53.

As previously described, the scale-beam 33 carries a contact-maker 40, which is adapted to engage the contact-strip 64, carried by the tilting circuit-closer, (designated as a whole at 65.) This circuit-closer comprises a contact-bearing conducting-arm 66, carrying the contact 67, between which and the contact-strip 64 the circuit is adapted to be closed to the electromagnets 53ª. The circuit-closer 65 also comprises a returning finger 68, formed with the conducting-arm 66 and a weighted rod 69, and it is pivotally mounted to swing or tilt upon the shaft 70, supported upon the standard 71. The sleeve 72 of the circuit-closer, about the shaft 70, carries a binding-post 73, to which one of the leads 74 to the electromagnets 53ª is attached, the other lead 75 of said electromagnets being connected to a binding-post 76, secured to the standard 71, said lead including the battery or other suitable source of current-supply, (indicated at 77.) A contact-strip 78, also carried by the conducting-arm 66, bears on the sleeve 72. The circuit may be traced when the contacts 64 and 67 are closed through the said contact-strip 64 to the contact-strip 78, the intermediate metal portions being suitably insulated from the conducting-arm 66, thence through the contact-strip 78 to the sleeve 72, through the sleeve and binding-post 73 to the lead 74, through the lead 74 to and through the electromagnets 53ª to the lead 75, battery 77, and binding-post 76, thence through the standard 71 to the part of the sleeve 72 carrying the conducting-arm 66, the insulation 79 serving to isolate the conducting-arm 66 from that part of the sleeve 72 carrying the binding-post 73, and from thence over the conducting-arm 66 to the contact 67.

It is evident that the weighted end of the scale-beam 33 carrying the contact-maker 40 is adapted to close the circuit of the electromagnet 53ª, which when energized operates the tripping-lever, thereby releasing the cut-off-valve frame and permitting the valve to be closed by the weighted arm 51 and the stream of material entirely cut off.

I provide a supplemental or auxiliary circuit-breaking device at the magnet-box, which momentarily opens the circuit and discharges the electromagnet. This device comprises a contact-carrying rod 85, which carries the carbon contacts 86, a spring 87 serving as a take-up for said carbon contacts. A spring 88 normally tends to open the contact, and a locking device is employed to normally overcome the spring and keep the contacts together. This locking device comprises a bell-crank lever 89, pivoted at 90, with one of its arms notched at 91 to engage the head 92 on the carbon rod 85 and a stud 92 in the plane of the lower end of the tripping-lever 56. I shall give a more particular description of the operation of this supplemental circuit-breaker in connection with the general description of the operation of the machine as a whole.

These features which I have just described in themselves are claimed in the application aforesaid and, except in combination, constitute no part of my present invention.

I shall now proceed to describe generally the operation of my improved machine, having given a description of its construction.

I have previously assumed the load-receiver to be in its highest position for the reception of its load, with the screw stream-controller rotating at its greatest velocity and delivering the maximum quantity of the material into the said load-receiver. The load-receiver now commences to seek a position of equilibrium or poise, and the positive feed of the material is gradually decreased by reason of a decrease in the velocity of rotation of the screw stream-controller. This decrease of speed is caused by the driven worm-disk seeking to approach the neutral point of its driving-disk, and this tendency of movement is checked, but gradually permitted, by the cam-rod 46, which, moving upward, gradually permits the connecting-frame at its outer end to rise. When the said outer end of the connecting-frame reaches the head of the tripping-lever, it engages the inclined face of said head and sets the supplemental contacts in a manner fully described in the application aforesaid, and finally it engages in the notch of said head and is held thereby. When this occurs, the cam-rod releases its hold upon the connecting-frame and continues to rise to a predetermined point. The screw stream-controller is now rotating at its minimum velocity and feeding but a very small quantity of the material into the load-receiver, which at this stage assumes a poised position weighing the material. When the material is weighed, a very minute quantity of the material is fed into the load-receiver, and the scale-beam has a slight further movement, which establishes the electro magnet-circuit, energizes the magnets, and disengages the tripping device when the driven worm-disk assumes a position opposite the cavity in the driving-disk, and thus the movement of the screw stream-controller ceases and the feed of the material is checked or cut off.

It will be apparent from the foregoing description that my present invention consists in the provision of means whereby the material is positively forced through the delivery-chutes into the load-receiver and this force-feed regulated automatically to gradually decrease the stream of material from a condition of full feed to one of minimum feed and to accomplish this result in combination with mechanism which permits a free movement of the scale-beam until the load is weighed and in readiness to be discharged.

Having thus described my invention, what I claim as new therein, and desire to secure by Letters Patent, is—

1. In a weighing-machine, positively-acting stream-controlling mechanism, adapted to cut off the supply or stream of the material, comprising a force-feed, speed-varying mechanism, adapted to act upon said force-feed and automatically vary said feed between the limits of two extremes of movement, connecting mechanism acting to operate the speed-varying mechanism and driving mechanism invariably and positively acting upon the connecting mechanism which driving mechanism is actuated by the main shaft of the machine.

2. In a weighing-machine, a rotatable force-feed device, speed-varying mechanism acting upon said force-feed device, driving mechanism for said variable-speed mechanism and connecting mechanism acting upon the variable-speed mechanism to cause a variation of the speed together with positively-acting mechanism for operating the connecting mechanism which is driven by the main shaft of the machine.

3. In a weighing-machine, a rotatable force-feed, speed-varying mechanism acting upon the force-feed comprising friction-connected disks, means for driving said disks, connecting mechanism acting upon one of the friction-disks to cause a variation of speed and positively-driven cams operating the connecting mechanism.

4. In a weighing-machine, a force-feed, friction-connected disks one of which is movable along the face of the other, a lever-arm connected with said disk, a thrust-rod operating said lever-arm and a cam, driven from the main shaft of the machine, for operating the thrust-rod.

5. In a weighing-machine, the combination with the scale-beam and load-receiver carried thereby of a rotatable stream-controller, driving mechanism therefor, intermediate speed-controlling mechanism for the stream-controller and cam-operated mechanism connected with the intermediate mechanism aforesaid.

6. In a weighing-machine the combination with the scale-beam and load-receiver carried thereby of a rotatable stream-controller and feeding device, mechanism for driving the same, intermediate mechanism between said driving mechanism and the stream-controller adapted to be operated in order to vary the speed of the stream-controller and cam-operated mechanism connected with the intermediate mechanism together with tripping mechanism, electromagnets for operating said trip mechanism and a circuit-closer operated by the scale-beam.

7. In a weighing-machine, a scale-beam and load-receiver carried thereby, a rotatable stream-controller and force-feed, mechanism for driving the same, intermediate speed-varying mechanism between the rotatable stream-controller and the driving mechanism, means for operating said variable-speed mechanism comprising a cam, a cam-operated rod, and a pivoted connection between said rod and the variable-speed mechanism, together with a tripping device adapted to engage and hold said pivoted connection momentarily, an electromagnet for operating said tripping device, a source of current-supply and a circuit-closer operated by the scale-beam when the load is weighed.

Signed by me at Chicago, Cook county, Illinois, this 21st day of January, 1899.

WILLIAM F. BRAUN.

Witnesses:
  CHAS. C. BULKLEY,
  L. M. BULKLEY.